US006674364B1

(12) United States Patent
Holbrook et al.

(10) Patent No.: US 6,674,364 B1
(45) Date of Patent: Jan. 6, 2004

(54) OBJECT FINDER

(75) Inventors: Paul Robert Holbrook, Buffalo Grove, IL (US); David Robert Low, Chicago, IL (US); Brian Scott Gaza, Naperville, IL (US); Joseph Born, Skokie, IL (US); Raquel Elizabeth Hurtado, Evanston, IL (US); Robert Thomas Buczkiewicz, West Bend, WI (US)

(73) Assignee: Digital Innovations, L.L.C., Chicago, IL (US)

( * ) Notice: Subject to any disclaimer, the term of this patent is extended or adjusted under 35 U.S.C. 154(b) by 292 days.

(21) Appl. No.: 09/966,695

(22) Filed: Sep. 28, 2001

(51) Int. Cl.[7] ........................... G08B 13/14; H04Q 7/00

(52) U.S. Cl. ............................. 340/568.1; 340/539.32; 340/825.36; 340/825.49; 341/176

(58) Field of Search ........................... 340/568.1, 539.1, 340/539.32, 825.36, 825.49, 573.1, 825.69, 825.72; 341/176, 173, 177

(56) References Cited

U.S. PATENT DOCUMENTS

| | | | |
|---|---|---|---|
| 3,981,010 | A | 9/1976 | Michelsen |
| 4,101,873 | A | 7/1978 | Anderson et al. |
| 4,151,525 | A | 4/1979 | Strauch et al. |
| 4,224,596 | A | 9/1980 | Knickel |
| 4,433,335 | A | 2/1984 | Wind |
| 4,476,469 | A | 10/1984 | Lander |
| 4,507,653 | A | 3/1985 | Bayer |
| 4,528,566 | A | 7/1985 | Tyler |
| 4,660,039 | A | 4/1987 | Barricks et al. |
| 5,204,657 | A | 4/1993 | Prosser et al. |
| 5,294,915 | A | 3/1994 | Owen |
| 5,396,218 | A | 3/1995 | Olah |
| 5,406,275 | A | 4/1995 | Hassett et al. |
| 5,455,560 | A | 10/1995 | Owen |
| 5,588,038 | A | 12/1996 | Snyder |
| 5,598,143 | A | 1/1997 | Wentz |
| 5,638,050 | A | 6/1997 | Sacca et al. |
| 5,648,757 | A | 7/1997 | Vernace et al. |
| 5,680,105 | A | 10/1997 | Hedrick |
| 5,686,887 | A | 11/1997 | Chen et al. |
| 5,686,891 | A | 11/1997 | Sacca et al. |
| 5,710,556 | A | 1/1998 | Nishimura et al. |
| 5,790,021 | A | 8/1998 | Mickel et al. |
| 5,796,338 | A | 8/1998 | Mardirossian |
| 5,801,627 | A | 9/1998 | Hartung |
| 5,821,895 | A | 10/1998 | Hounam et al. |
| 5,892,447 | A | 4/1999 | Wilkinson |
| 5,939,981 | A | 8/1999 | Renney |
| 5,955,982 | A | 9/1999 | Moulin |
| 5,959,532 | A | 9/1999 | Fujiuchi et al. |
| 5,999,799 | A | 12/1999 | Hu et al. |
| 6,002,427 | A | 12/1999 | Kipust |
| 6,075,458 | A | 6/2000 | Ladner et al. |
| 6,084,517 | A | 7/2000 | Rabanne et al. |
| 6,097,189 | A | 8/2000 | Arndt et al. |
| 6,133,832 | A | 10/2000 | Winder et al. |
| 6,147,602 | A | 11/2000 | Bender |
| 6,304,183 | B1 | 10/2001 | Causey |
| 6,331,817 | B1 | 12/2001 | Goldberg |

*Primary Examiner*—Donnie L. Crosland
(74) *Attorney, Agent, or Firm*—Lloyd L. Zickert

(57) ABSTRACT

Apparatus relates to systems and devices for enabling persons to locate lost or misplaced objects and items in households, offices, and other work places. Such devices and items may include remote-control devices for television sets, VCR's, calculators, and miniature dictating machines. The apparatus comprises a wireless transmitter for producing a unique digital signal or data packet for a codable wireless receiver coded to respond only to the specific transmitter to cause the coded receiver to emit an audio signal or sound from a sound generating device for locating a misplaced object.

20 Claims, 7 Drawing Sheets

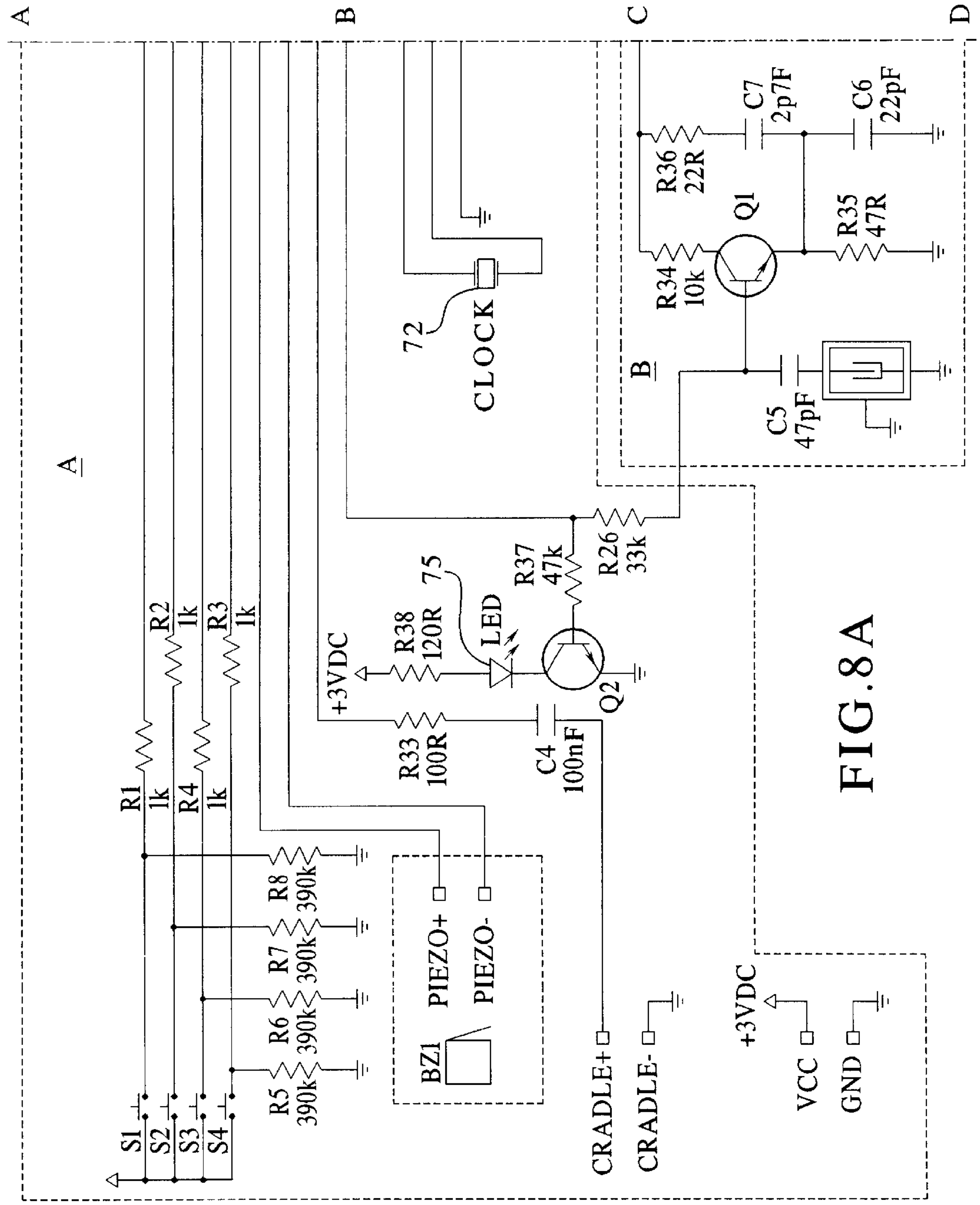
FIG.8A
FIG.8
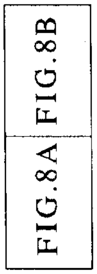

OBJECT FINDER

This invention relates in general to systems and devices for enabling persons to easily locate and find lost or misplaced objects or items common to a household or office environment, and more particularly to a system utilizing a wireless transmitter and a plurality of wireless receivers attachable to objects or items needing to be located at various times. Some examples of such objects or items are keys, remote-control devices for controllable electronic equipment, like television sets, VCR's, calculators, miniature hand-held dictating machines, and other small objects.

BACKGROUND OF THE INVENTION

There have been several devices heretofore known that have attempted to solve the problem of locating lost or misplaced items. The following prior art devices relate to systems and devices for object finding: A product marketed as the Magnavox remote locater; a product marketed as the Brookstone SmartFind remote control key finder; U.S. Pat. Nos. 5,638,050 and 5,686,891 relating specifically to a locating system for a remote control having a "home base"; and U.S. Pat. Nos. 5,204,657; 5,648,757 and 5,790,021. These prior known devices have suffered from one or more of several deficiencies.

With one recent exception, previous devices are single-use devices where only one object could be located with the system. The one recent exception is the Brookstone product which allows users to locate up to two objects. This system will not allow the user to keep track of more than two items. Also, this product only provides for key chain attachment, and does not allow for a more permanent and secure attachment to a variety of other commonly misplaced items, such as remote-control devices, cell phones, PDA's, pagers, electronic devices, etc. This,product also suffers from the multiple system interference problem described below, and also does not provide any means to prevent the misplacement of the transmitter itself.

For systems with more than one receiver (for example, the Brookstone product), no provision is made to easily and conveniently identify which button on the transmitter corresponds to which lost object. This results in the user occasionally pressing the wrong button and locating the wrong object. This is nuisance and results in lost time and effort in retrieving an object. Further, each receiver required different circuitry to specifically respond to a selected transmitter signal.

The receiver portion of the Magnavox Remote Finder system is prohibitively large to be conveniently attached to a variety of objects. This is certainly true when attempting to attach the receiver to small objects such as key chains, but is also true for larger objects such as remote-control devices. The Magnavox receiver is approximately 3"×2.5"×0.75" thick.

No provision is made to preclude multiple system interference in any heretofore system. That is, when two systems are operating near each other, activation of one transmitter will cause all respective receivers within range to respond with their beep tones. For example, with the SmartFind product, pressing the button for receiver number one on one transmitter will cause all receiver number one's within range to start beeping. The claimed range of the Brookstone product is eighty feet, so this problem could often occur among apartment dwellers or people living in houses in close proximity. This, of course, is a major annoyance to the consumer owning the unintended receiver.

There is no provision made to avoid misplacing the transmitter unit. It is unreasonable to assume the transmitter will not occasionally get misplaced itself, and if no provision is made to allow the transmitter to be easily located, that, of course, defeats the whole purpose of an object finder.

SUMMARY OF THE INVENTION

Users of the present invention may conveniently keep track of a high number of commonly misplaced objects or items having receivers attached thereto. The invention as disclosed includes a transmitter that can accommodate twelve receivers all coded with different addresses, but the circuitry can be designed to accommodate any number of receivers.

The receivers are minimally sized so they can be attached in an unobtrusive manner to a variety of objects. In the present invention, the receiver is approximately 2.5"×1.35"×0.2" thick. This is approximately half the volume of the smallest receivers on competitive products.

The receivers of the present invention are designed such that they may be attached in a semi-permanent manner (by double-sided adhesive tape or similar attachment means) to objects such as remote-control devices, PDA's, cell phones, pagers, and other electronic devices, etc., or by using a simple plastic casing extension, the receivers are capable of being easily connected in a hanging fashion to objects such as key chains, backpacks, etc.

The system of the present invention is designed to substantially reduce the potential for multiple system interference. This is accomplished by having each transmitter button or key when pressed correspond to a relatively unique transmission data packet and constructing transmitters having different addresses or ID's (identification). The data packet is preferably comprised of 20 bits as follows:

$\underline{1}\ \underline{1}\ \underline{1}\ \underline{1}\ \underline{1}\ \underline{1}\ \underline{1}\ \underline{0}$ (header—always same 8 bits)

. . . (4 bit receiver address—up to 16 unique addresses possible)

$\underline{0}$ . . . $\underline{0}$ (8 bit transmitter ID—up to 63 unique IDs)

The first 8 bits (bits 0–7) will be an identification or header to indicate the start of a valid data transmission. Each receiver will not begin to compare the data packet to its memory until it sees the valid header. Every header will be the same regardless of transmitter or receiver. The header should be seven 1's followed by a zero. Each programmed receiver's uniqueness is defined by the remaining 12 bits (bits 8–19) which is composed of a 4 bit word to indicate which of the 12 receivers the transmitter can look for and a 6 bit word framed by 0's to indicate which of 63 different transmitters the receiver is coded for receiving a signal. There would be 64 possible combinations, but the design requires one bit, the null vector, to use as the receive option to the microcontroller, thereby providing 63 unique ID's. Of the last 8 bits, the first and last bits shall always be a zero, to preclude mistaking this portion of the data packet for the header portion. Thus, the transmitter ID is 6 bits framed by two zeros, and the transmitter ID is encoded by the 6 bits in the final 8 bits of the digital data packet.

When a user buys the product, a "starter kit" would be purchased that would include a transmitter and a plurality of identical receivers. Usually, three receivers are provided, although a user may use any number and even purchase more receivers, as the transmitter is capable of handling 12 receivers. The receivers are not coded for a transmitter or a selected signal from a transmitter at the time of purchase and before the battery is installed. When the user installs the battery in the receiver, it will start to beep (for example, once per second for a predetermined time), to notify the user that the receiver is waiting to be "coded." Coding to a transmitter is accomplished by the user pressing a selected receiver button switch on the transmitter. At that time the receiver will respond with a brief confirmation tone, then go silent to notify the user that the receiver has been "coded" to that transmitter and a selected receiver button on that particular transmitter to be responsive to a unique address.

In the unlikely event that two systems are in close proximity that have the same transmitter address, the user may correct this problem. When button receiver switches S6 and S7 are simultaneously pressed for one second or greater, the microcontroller will use ports PB0 and PB1 to drive the audio means in the form of a piezo transducer (BZ1). It is driven in an H-bridge configuration at 4096 kHz 50% duty cycle with PB0 and PB1 alternating between VDD and ground. The user will hear a 200 mS beep and 285 mS rest with one more 200 mS beep. Thus, pressing receiver switches 6 and 7 will toggle bit 6 (MSB of the transmitter address) to change or flip its state and consequently change the transmitter ID. Bit 6 may thereafter be toggled to return the address to its first form. When the transmitter ID is changed, the user then needs to re-code each of the receivers to the new address.

The transmitter of this invention is provided with twelve buttons and a writing area for the buttons to identify twelve receivers, each of which is responsive to a unique train of digital pulses or digital address. Thus, the user is able to easily identify which button to press to locate a desired object having a given receiver coded with a unique address. This writing area will be provided with a protective plastic lens cover, similar to the identification areas provided on many household telephones to protect the written identification from the environment.

The receiver of the invention includes an improved wake-up circuit to preserve battery life. The general idea of a wake-up circuit is known, as in U.S. Pat. Nos. 5,638,050 and 5,686,891. However, the improvement in the receiver of the present invention entails the use of a serial data stream with an embedded clock to greatly improve battery life over the standard wake-up circuit as described in the two referenced patents. With the standard wake-up circuit, when the receiver wakes up it must stay on for at least twice the length of time it takes to transmit one complete bit data packet. For example, if the transmission speed is 270 baud (bits/second) and the data packet is a 20 bit string, then the time to make that transmission is 20 bits divided by 270 bits/second, which equals 0.074 seconds, or 74 msec (mS). However, the receiver must stay on for at least twice this time, because if it came on just after the first bit of the transmission, then it must wait for the remaining 19 bits to be received, then wait for the full 20 bits, because it does not start to compare the packet to what is in its memory until it detects the valid header. Thus, with the standard wake-up circuit, the receiver wake-up time must be a minimum of 148 mS. Actually, the actual wake-up time is approximately 168 mS, because an additional 20 mS is required for the microcontroller to perform the actual comparison calculation.

The use of an embedded clock in the present invention drastically improves battery life. For example, with the embedded clock, when a receiver wakes up for a predetermined period of time for every time interval to check for an incoming transmission, it must see a rising edge and a falling edge within 7.5 mS. The transmission of one bit produces a rising edge and failing edge pattern. If it does not see this structure during the wake-up period of time, it immediately goes back to sleep. So, this provides a reduction of 160.5 mS of receiver wake-up time for every wake-up period without a valid incoming transmission, which is almost 100% of the time. This feature drastically improves battery life.

Also, in the present invention, the specific transmitter serialization is provided by a network of resistors and capacitors. This allows the use of a microcontroller having a RAM, without the need for a separate memory chip. The network includes six resistors and from one up to six capacitors, and therefore 63 different transmitters can be provided, each having a unique ID by removal of one or more of the capacitors when the transmitter is manufactured. Even with the maximum 12 components, these are extremely inexpensive components compared to a memory chip used to provide different ID's, resulting in a minimum of ten times cost savings. Also, the added components can be easily placed anywhere on the printed circuit board, whereas a memory chip is large and makes for a larger and more difficult printed circuit board layout.

The present invention is provided with a storage base to hold the transmitter when not in use. The transmitter includes a finding function if it is misplaced, wherein the storage base has a conductor that connects two corresponding metal contacts on the transmitter when it is placed in the base to assure the user the transmitter is at a home base position and not misplaced. Each time the transmitter is removed from the base, contact is broken between the contacts and a timer circuit engages. After a predetermined time, if the transmitter has not been returned to the base, a beeper will sound to alert the user that the transmitter has not been returned to the base and as to its location. If the transmitter is still not returned to the base after a second predetermined time, then a second reminder tone will sound. If still not returned after a further predetermined time, a third tone will continue to sound until the transmitter is returned to the base to defeat the timer circuit. This last tone could be similar to a smoke alarm signal, for example a small chirp once every minute until returned. This finding function may be defeated by simultaneously pressing button switches 1 and 12 for a predetermined period of time.

The storage base or cradle for the transmitter is constructed of two pieces that may have different configurations, dependent upon the desired use of the base. In one configuration, the base may be either rested or semi-permanently mounted on a horizontal surface such as a table or kitchen counter. In the second configuration, the base may be mounted in a semipermanent vertical position, such as on a wall or refrigerator front. Accordingly, this reminder feature makes it essentially impossible to misplace the transmitter.

It is therefore an object of the present invention to provide a new and improved object finder for facilitating the finding of misplaced or lost items within a household or office environment.

Another object of the present invention is in the provision of an object finder including a wireless transmitter and a plurality of wireless receivers attachable to objects wherein the transmitter is capable of easily being configured to have a large number of different ID's, thereby substantially reducing multiple system interference with other transmitters and electronic devices.

Another object of the present invention is to provide an object finder including a wireless transmitter and a plurality of wireless receivers including an improved receiver wake-up feature that drastically improves the battery life of a receiver.

A still further object of the present invention is in the provision of an object finder having a transmitter and at least one receiver, each having circuitry using a microcontroller having a RAM, thereby eliminating the necessity to use a separate memory chip and substantially reducing the cost of the circuitry for a transmitter.

A still further object of the present invention is in the provision of an object finder having a transmitter and a plurality of receivers which includes a feature of assisting in the finding of the transmitter should it become misplaced.

Another object of the present invention is to provide an object finder including a transmitter and a plurality of receivers, wherein the transmitter includes a microcontroller capable of having one bit of the transmitter address that can be toggled to change its ID and eliminate interference with another transmitter initially having the same ID.

A still further object of the present invention is to provide an object finder having a transmitter and a plurality of receivers that are identical and codable to respond to a unique data packet from the transmitter.

A still further object of the present invention is to provide an object finder having a transmitter and a plurality of receivers that are identical and codable to respond to a unique data packet from the transmitter, and where the circuitry of the transmitter may be modified to provide a substantial number of transmitters having unique data packet identifications.

Another object of the invention is to provide an object finder having a transmitter and a plurality of receivers, wherein a home base or cradle is provided for the transmitter, and the transmitter has a finding feature that is automatically activated when removed from the base and which after a predetermined period of time energizes an audio or visual signal, and further wherein the finding feature may be selectively defeated.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 6 is a perspective view of the transmitter supported on a base adapted to be supported on a table or desk top or the like;

FIG. 8 which includes FIGS. 8A and 8B is a schematic wiring diagram of the transmitter module.

DETAILED DESCRIPTION OF THE INVENTION

Figure 1:
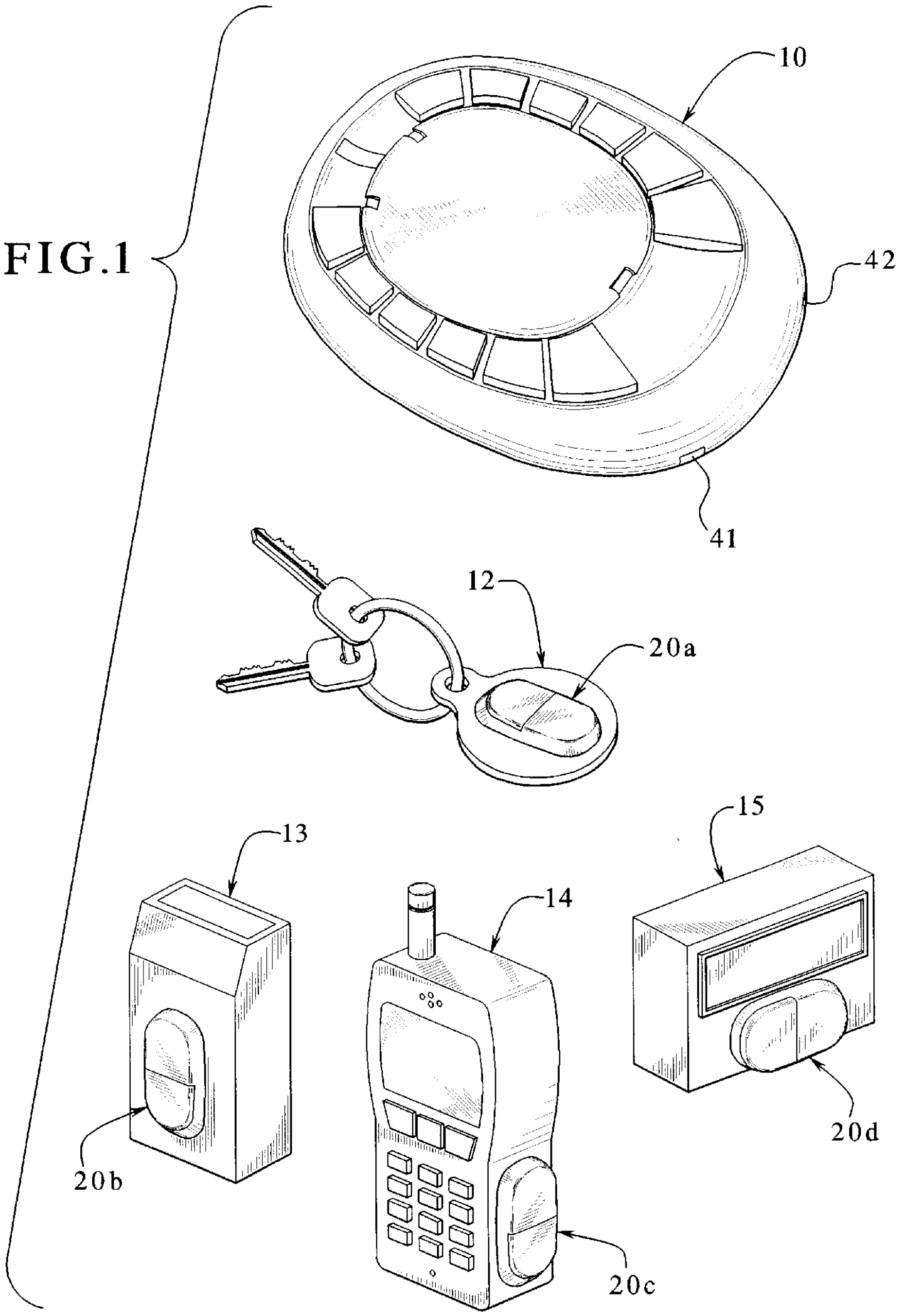
FIG. 1 is a perspective view of the object finder system of the invention including the transmitter and four receivers mounted on four different objects or items.
Figure 3:
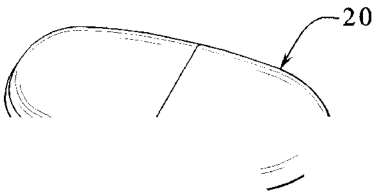
FIG. 3 is a perspective view showing one of the receiver modules according to the invention of a type which is adapted to be attached to objects by double sided adhesive tape.

Referring now to the drawings, and particularly to FIG. 1, a fully assembled transmitter, generally designated by the numeral 10, is shown with a plurality of objects 12, 13, 14 and 15, each of which has a receiver attached thereto like the receiver 20 shown in FIG. 3. For purposes of explaining the invention below, the objects 12 to 15 are, respectively, a key ring with a fob, a remote control device for electronic unit such as a television, VCR or the like, a cell phone or walk-around phone, and a beeper. Further, for purposes of explaining the invention, the objects 12 to 15, respectively, have suitably attached thereto receivers 20*a*, 20*b*, 20*c* and 20*d*.

Figure 2:
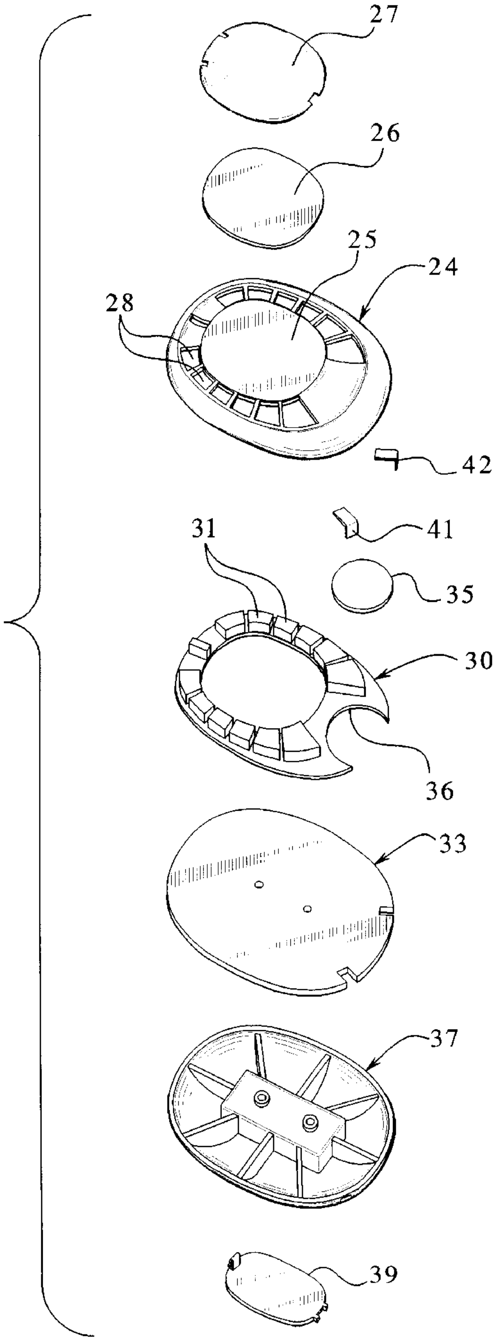
FIG. 2 is an exploded perspective view of the transmitter showing the components of the transmitter.
Figure 3:
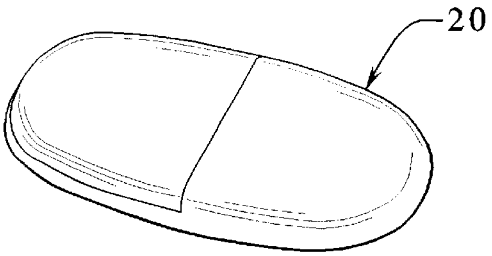

The exploded view of the transmitter in FIG. 2 shows the various parts which include a front or top housing 24 having a central somewhat oval shape portion 25 onto which a similarly shaped writeable sheet or label 26 is placed and thereafter held in place by a lens cover 27. On the embodiment disclosed, in somewhat symmetrically arranged position around the central portion 25 are a plurality of button openings 28 wherein identification of each button may be made by applying identification data on the writeable sheet 26 adjacent the button openings. A rubber keypad 30 includes a plurality of buttons or keys 31 corresponding to and receivable in the button openings 28 on the housing 24 so as to be arranged around the central portion 25 of the housing. Switches are provided on the buttons for activation of the various receivers, as will be more clearly explained below. While twelve buttons are shown to be received in twelve openings of the housing, it will be appreciated that any number may be provided depending on the design of the transmitter. Positioned under the keypad is a printed circuit board assembly 33 with switch sites for the buttons 31.

A piezoelectric beeper element 35 fits in the cutout 36 on the rubber keypad 30 and at the underside of the top housing 24. The beeper element will be connected into the circuitry on the printed circuit board.

The printed circuit board is mounted on a bottom housing member 37. A battery compartment is provided at the underside of the bottom housing 37 and a battery cover or door 39 closes the compartment. Preferably, the transmitter is powered by a pair of AAA batteries that provide three-volt power.

The buttons on the keypad may be clear or colored to facilitate the transmission of light from a light-emitting diode (LED) mounted below on the printed circuit board assembly 33. Thus, when a transmitter button 31 is pressed, the LED illuminates to indicate to the user that contact has been made. It should be appreciated that an audio sound such as a beep may also be indicated by a suitable configuration of the transmitter circuitry. Further, the LED may serve as a low battery indicator for the transmitter as the LED will dim as the batteries run down.

Figure 6:
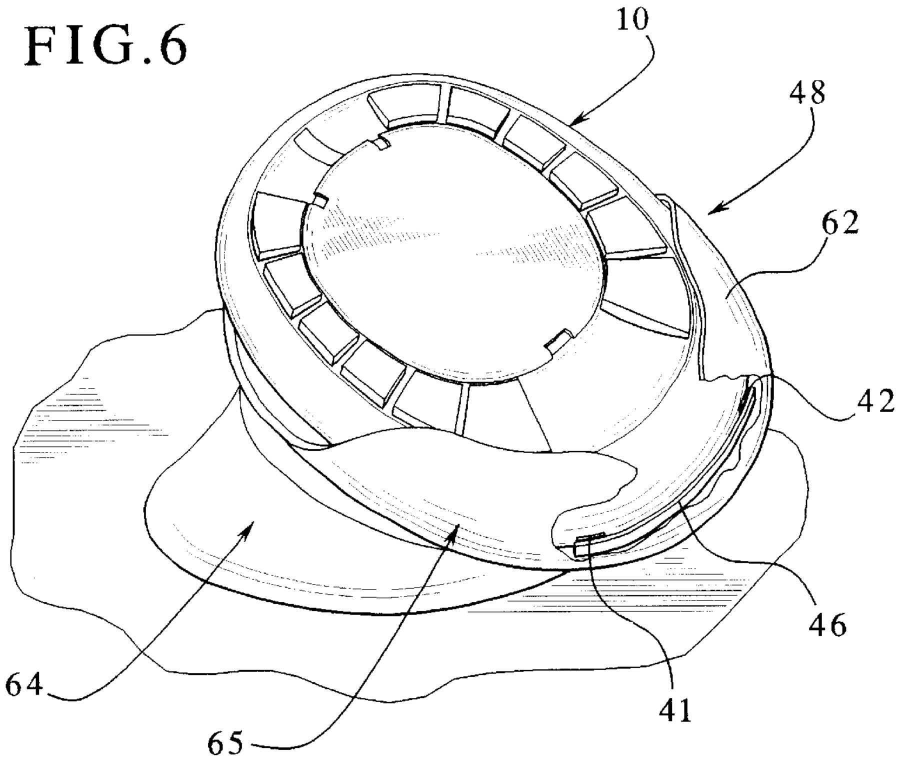

A pair of contacts 41 and 42 are mountable on the housing 37 and connected into the printed circuit board to a timing circuit so that the transmitter coacts with a conductor 46 on a base 48 (FIG. 6). When the transmitter is supported by the base to defeat the timer circuit, removal of the transmitter from the base triggers the timer circuit to energize a reminder beeper after a predetermined period of time indicating to the user that the transmitter is separated from the base to indicate to the user the location of the transmitter if it is misplaced. As above indicated, as soon as the transmitter is returned to the base, the timer circuit is defeated and the beeper is no longer energized and therefore silent. This feature can be defeated, as previously explained.

Figure 4:
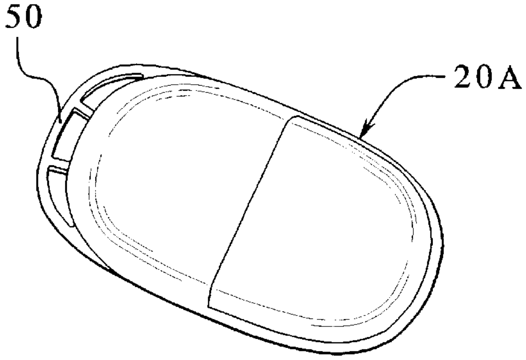
FIG. 4 is a perspective view of a modified receiver module which is adapted to receive a chain or the like for connecting the module to an object.

The receiver 20 is shown in one form in FIG. 3 and in another form as 20A in FIG. 4, which additionally includes an apertured extension 50 for facilitating the attachment or connection of the receiver to a chain or string for connection to an object. The receiver 20 may be provided on its underside with double-stick tape fastener for facilitating the attachment of the receiver to various objects. Alternatively, a Velcro fastener may be used.

Figure 5:
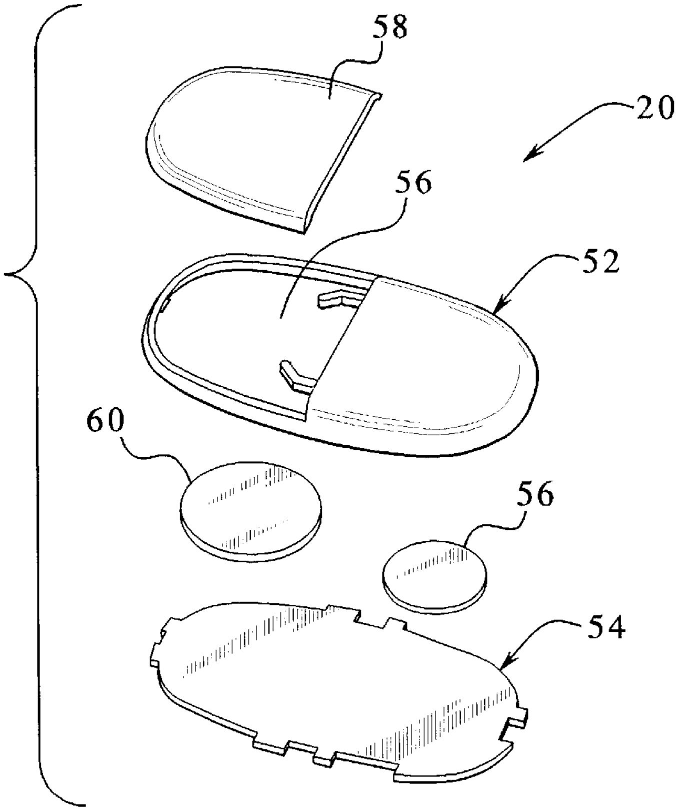
FIG. 5 is a perspective disassembled or exploded view of the receiver module of FIG. 3.

The receiver 20 in FIG. 5 includes a main housing or casing 52 opening to the underside and closable by a printed circuit board assembly 54. A beeper in the form of a piezoelectric unit 56 is suitably connected to the printed circuit board at the top side of the housing 52. A battery compartment 56 closable by battery cover 58 provides a compartment for a lithium battery 60 for powering the receiver circuit on demand.

Figure 7:
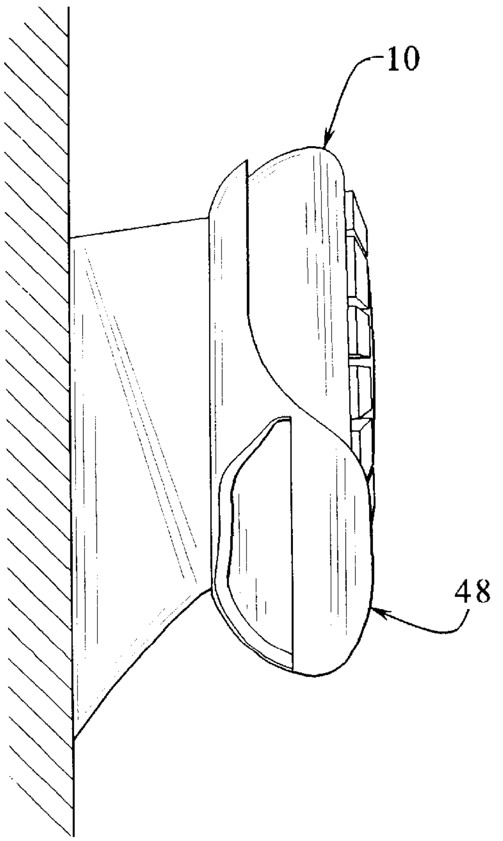
FIG. 7 is a side elevational view of the transmitter supported by a base mounted on a vertical wall to illustrate another mounting arrangement for the base.

The transmitter storage base 48 is shown in FIG. 6 as being in a form supportable on a horizontal surface such as a desk or counter top and having a generally U-shaped socket 62 for receiving the lower front end of the transmitter in such a way that the contacts 41 and 42 on the transmitter will engage the conductor 46 to disable the transmitter locating timing circuit. The base 48 includes a lower member 64 and an upper member 65. The upper member has the U-shaped socket or cradle 62 for receiving the transmitter, and the upper member 65 is rotatable into two positions, one position for use on a horizontal tabletop as shown in FIG. 6 and the other position for use as a wall-mounted unit as shown in FIG. 7.

Transmitter

Figure 8B:
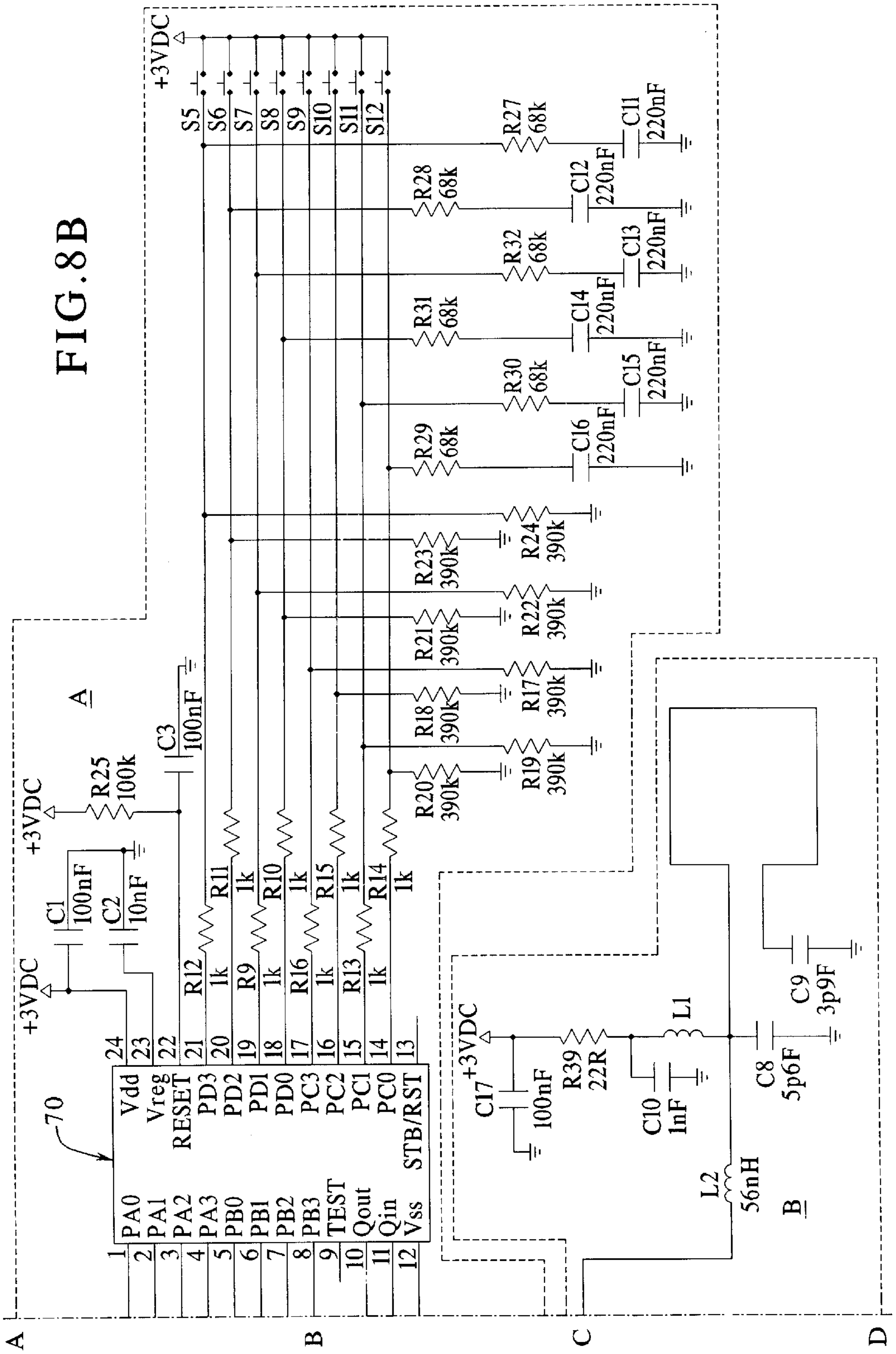

The transmitter circuit as shown in FIG. 8 includes a digital section A for generating a digital data packet and a radio frequency (RF) section B for broadcasting the packet to receivers. Upon a user's request via a button press in the digital section A, a digital signal or data packet from the digital section corresponding to the button pressed is sent to the RF section, and an LED circuit in the digital section A is turned on to energize the LED 75 and produce a visual signal indicating a data packet signal was produced. The RF section is turned on and will then broadcast the data packet which includes, as above mentioned, a header, a receiver address, and a transmitter ID. The header is always first in the packet for waking up the receiver so that the receiver can then compare the remainder of the packet.

The digital section labeled "A" consists of a microcontroller or controller 70 having both a RAM and a ROM, a 32.7681 kHz (kiloHertz) system clock 72 connected to the microcontroller, a three-volt power source provided by two AAA alkaline batteries in series, a transistor for turning on the LED, coils, resistors, capacitors, switches, a piezo transducer 74 and the LED 75. The values for the resistors, capacitors and coils are shown on the drawings, as well as the type of microcontroller employed. The microcontroller is pre-programmed with software to provide the functions hereafter described. The digital section provides the following five functions:

1. Detection of user request.
2. Indication of various states or modes.
3. Set up intervals of time between events.
4. Detection of a transmitter serialization.
5. Assembling the data in predetermined format and driving the RF circuitry.

Detection of user requests is produced by switches S1 . . . S12, resistors R1 . . . R24 and microcontroller ports PA0 . . . PA3, PC0 . . . PC3, and PD0 . . . PD3. The twelve ports are set as inputs and are high impedance. The main loop of the microcontroller includes a routine that checks the state of the above mentioned twelve input/output (I/O) ports every 250 mS (milliseconds). The quiescent port state is low due to the pull down resistors R5 . . . R8, R17 . . . R24. The port state is driven high when a user presses one or more of the 12 switches S1 . . . S12. When a receiver locating button switch is pressed, it shorts VDD to the corresponding microcontroller port. This will cause the port pin read to toggle from low to high. The port is protected by the 1 K ohm resistor in series between it and the switch, as well as electrostatic discharge (ESD) protection. If a nonzero result is read during one of the 250 mS periods, it is stored in the random access memory (RAM) and another 250 mS scan is taken, the new port read value is compared with the previous 250 mS scan, and if they agree, the port data is valid and the key values are decoded into an address (bits 11 . . . 8 of the 20 bit data stream).

Indication of special user modes or states requires switches S6, S7, S1, S12, the piezo transducer 74 (BZ1), resistors R1, R8, R14, R20, R11, R23, R9, R21, R33 and capacitor C4. The microcontroller ports used are PA0, PC0, PD1, PD2, PB0 . . . PB3. The piezo transducer when energized produces an audio signal or sound.

The user may request two special modes via the keys. When switches S6 and S7 are simultaneously pressed (detection described above) for one second or greater, the microcontroller will use ports PB0 and PB1 to drive the piezo transducer(BZ1). It is driven in an H-bridge configuration at 4096 kHz (kiloHertz) 50% duty cycle with PB0 and PB1 alternating between VDD and ground. The user will hear a 200 mS beep and 285 mS rest with one more 200 mS beep. The microcontroller will toggle bit 6 (MSB of the transmitter address) to change the transmitter ID. Thereafter, the receivers will need to be recoded.

If button locator switches S1 and S12 are simultaneously pressed for 1 second or more, the user is requesting the transmitter to enable or disable the transmitter find function. The piezo transducer 74 is driven in the same manner as before with the find function enabled, indicated with a 200 mS beep 285 mS rest, and another 200 mS beep. The disable feature is verified by sending a 200 mS beep. When the transmitter find function is enabled, the RC network formed by R33 and C4 is continually being pulsed by port PB2. Port PB2 is set as an output every 125 mS and driven to VDD for 2 mS, and then switched to ground for 60 $\mu$S (microseconds). Then port PB2 is tri-stated (high z) (high impedance) and the port state is read. If data is not zero, the cradle is assumed to be present as the cradle (+), and cradle (−) contact must be connected to form a closed circuit. Should the data read 0 continually on port PB2, then a timer formed by a bank of 4 nibbles created in the RAM of the microcontroller is decremented. This timer has a base resolution of 0.125 seconds and is kept using the timer interrupt service on the microcontroller. If the 16 bit timer counts out an interval equivalent to 10 minutes, then a "find signal" will be issued via piezo transducer BZ1 and ports PB0 and PB1. The signal is of a one-minute duration cut up into twelve five-second intervals with three bursts of 50 mS on, 50 mS off within the five-second interval. The controller will then begin a new ten-minute interval. If this ten-minute interval expires, the controller will issue through ports PB0 and PB1 and piezo transducer BZ1, two five-second periods of three 50 mS on and 50 mS off. The controller then sets a count equivalent to 24 hours. If this count expires (no cradle detected), the sequence repeats.

The piezo transducer and ports PB0 and PB1 also provide one more indication via feedback from the RC network, R33 and C4. Within the microcontroller a flag is kept indicating the cradle status (present or not present). If a change from cradle not present to present status (the transmitter being separated from the base) is detected via the RC network, the flag is changed and compared to the previous flag state. It will not agree on the first instance of change but if the cradle still remains present (125 mS later) the flags will agree and the microcontroller will issue a 100 mS beep, 100 mS rest, and 100 mS beep.

Configuration of the transmitter ID is accomplished with resistors R27 . . . R32, and capacitors C11 . . . C16, which provides a serialization for a 6 bit address. Each transmitter is configured to have a unique ID by the selective removal of one or more of the capacitors C11 . . . C16 to provide 63 different transmitter ID's. It should be appreciated that the circuitry can easily be configured so that more or less transmitter ID's could be provided if desired. Microcontroller ports PC0, PC1, PD0 . . . PD3 are used to drive and detect port status. At initial power up, the microcontroller calls a function that initially configures ports C and D outputs with them pulled to ground for about 20 mS. The ports are then charged for 200 mS, briefly pulled to ground (2 mS) and then tri stated and read. Ports reading nonzero are assumed to have a complete RC network installed. These ports represent the six bits starting at bit 6 of the 20 bit data stream and ending at bit 1. Bit assignments are: PC1, PC0, PD3, PD2, PD1, PD0 most significant bit (msb) first and the least significant bit (1 sb) last. Note that the null vector is reserved for microcontroller function. If ID bits read zero, then the microcontroller will function as a receiver.

Port PB3 will drive the RF circuitry once it is determined by the microcontroller that a user is requesting a receiver. Port PB3 driving to VDD will cause transistor Q2 to turn on allowing current to flow through resistor R38 and LED1. In addition, the base of RF transistor Q1 is modulated by the 315 mHz SAW resonator 76 and capacitor C5.

The RF operating frequency is 315 mHz. This is set by the SAW resonator primarily and capacitors C7, C6, resistor R35 and the PCB (printed circuit board) loop antenna. Together these function as an oscillator at or near the 315 mHz frequency according to the equation $f=\frac{1}{2}\pi\sqrt{(CtL)}$, where L=the PCB trace inductance and Ct=the total capacitance of C7 and C6. The equation for the frequency is one over two π times the square root of the total capacitance times the inductance. Because these components can vary over temperature, time and part to part tolerance, the SAW resonator is necessary since it has a bandwidth of about 100 kHz.

Receiver

Figure 9:
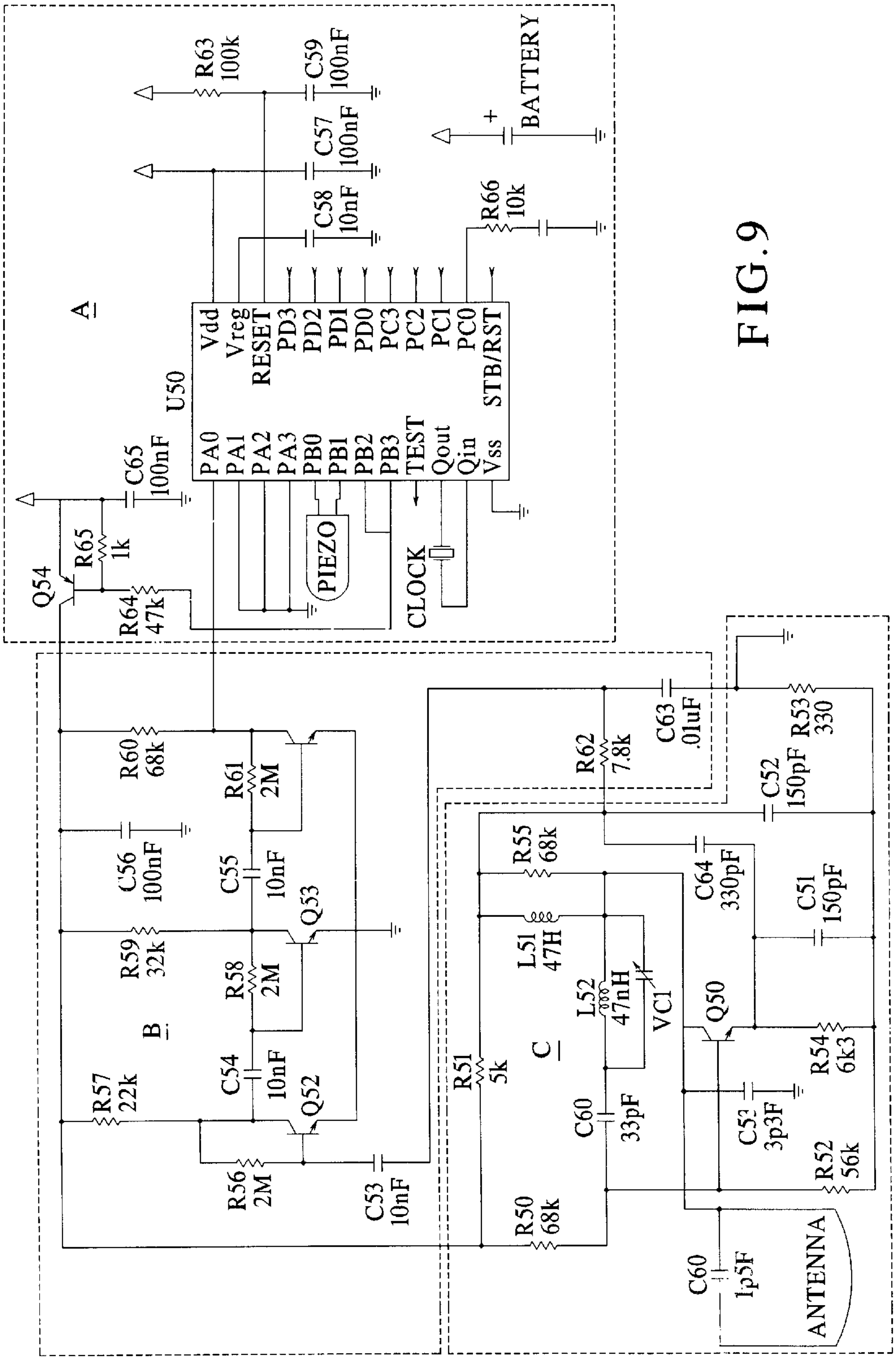
FIG. 9 is a schematic diagram of the receiver module.

The receiver circuitry shown in FIG. 9 includes an RF section C for receiving a transmission of a data packet from the transmitter, an amplifier B for amplifying the data packet transmission, and a digital section A for comparing the data packet to that stored in the RAM of the microcontroller. If the data packet compares to the stored data packet, the controller will trigger the sound generator in the form of a piezo transducer.

The system's receiver has three unique modes:

- A learn mode that allows a user to program a receiver to have a unique address,
- The ability to identify itself and also the appropriate transmitter, and
- The ability to notify the user of a low battery condition well in advance of the battery going beyond useful life.

The receiver learn mode is determined when the user first applies power to the receiver by installing a 3-volt lithium cell. At this point the microcontroller or controller 78 drives the piezo transducer 80 with ports PB0 and PB1 as previously described in for the transmitter. The transducer emits a sound signal. It should be appreciated that a visual signal, such as a flashing LED, could also be additionally provided or substituted for the sound signal. The microcontroller 78 is programmed with software identically to the microcontroller 70 in the transmitter and is in a learn mode when first powered. The learn mode will last for 30 seconds. During this period the microcontroller will change ports PB2 and PB3 from an input (tri-state) to a grounded output. The transistor Q54 will turn on allowing power to energize the amplifier section (B) and RF section (C). Power will remain applied until the microcontroller receives a valid bit packet from the digital section A of the transmitter, as above described in the Summary of the Invention, from depressing a button on the transmitter that is read at port pin PA0. The 4 bit receiver ID field and 6 bit framed by 0's transmitter ID field are stored in the RAM of the microcontroller of the transmitter and the receiver, and a valid bit packet transmitted upon pressing a selected transmitter button causes the coded receiver to respond and emit a signal indicated to the user. These stored values become the receiver's unique ID, compared at each reception of data. The ID is maintained as long as power to the receiver is not interrupted. Replacement of the battery to the receiver requires recoding of the receiver. The coding of the receiver is not affected by replacement of batteries in the transmitter.

The receiver under normal operation will change ports PB2 and PB3 to a grounded output every second for a 7.5 mS interval, during which time if the receiver detects a rising edge and falling edge pattern caused by the transmission of one bit from the transmitter, the receiver will wake up or stay on for receiving the entire data packet. If the data packet does not compare as to the receiver address, the receiver will turn off. If the receiver address compares, and then the transmitter address or ID compares, the RF section C will shut down and the piezo transducer will turn on to emit a sound signal. During this time the microcontroller will look for a proper bit pattern. Each bit has an embedded clock pulse starting with a clock high (1.22 mS), data (1.22 mS) and clock low (1.22 mS), (effective bit rate of 270 bits/sec). If this pattern is not read at PA0 within 10 mS of every interval of a second, ports PB2 and PB3 return to an input (tri-state) powering down sections B and C of the receiver. Thus, if the comparison of the transmitted receiver address is not valid, the receiver will turn off. If the receiver address is correct, and the transmitter ID does not compare, the receiver will turn off.

The microcontroller of the receiver will also check the battery status each day. If the battery voltage drops below 2.6 volts, the receiver acknowledges tone changes as described above. When the microcontroller of the receiver measures a battery voltage of 2.4 volts or less, the microcontroller will beep every 20 mS until the voltage source drops below the minimum operation voltage of 1.8 volts for the microcontroller.

It will be understood that modifications and variations may be effected without departing from the scope of the novel concepts of the present invention, but it is understood that this application is to be limited only by the scope of the appended claims.

The invention is hereby claimed as follows:

1. An object finder system, comprising a transmitter module having radio frequency means for selectively generating radio frequency energy, a transmitting antenna connected to said radio frequency means for radiating the radio frequency energy, modulator means connected to said radio frequency generating means for modulating the radiated electrical energy, a digital system for selectively producing at least one train of digital pulses for operating said modulator means, digital controlling means for selectively producing at least two different trains of digital pulses, switching means including a plurality of selectively operable electrical switches for selectively energizing said modulator means while also selectively operating said digital controller means, for selecting one of said trains of pulses, a plurality of receiver modules having means for selectively attaching each module to an object which may need to be located, each of said receiver modules having a radio frequency receiving antenna, radio frequency receiver means connected to said receiving antenna, demodulator means connected to said radio frequency receiving means for selectively producing a received train of pulses corresponding to one of the transmitted trains of pulses, and audio frequency means for producing an audible signal to enable a person to locate the receiver module.

2. An object finder according to claim 1, in which said switches comprise a plurality of push-button switches.

3. A system according to claim 2, in which said receiver modules correspond with said push-button switches and are respectively operable by depression of one each of said push-button switches.

4. An object finder system according to claim 3, in which said digital controlling means comprise means for producing a different number of pulses in each of said trains of pulses for activating each of said receiver modules.

5. An object finder system according to claim 3, in which said digital controlling means comprise means for producing a different arrangement of pulses in each of said pulse trains for activating each of said receiver modules.

6. An object finder for locating misplaced or lost objects comprising:

a wireless transmitter and a plurality of wireless receivers attachable to objects, said transmitter including means for transmitting at least three unique digital data packets each including a header, a receiver address, and a transmitter ID, said transmitter having a plurality of switches actuable to send a unique data packet for each receiver, each said receiver codable to respond to a unique digital data packet transmitted by the transmitter and having signal means to indicate its location, and each receiver having means for connection to or attachment to an object.

7. The object finder of claim 6, wherein each transmitter and each receiver is powered by battery means, and each receiver includes a wake-up circuit responding to a rising edge and a falling edge of an incoming transmission from a transmitter to wake up the receiver for a valid data packet signal from the transmitter.

8. The object finder of claim 6, wherein the signal means includes a sound generating device.

9. The object finder of claim 8, wherein said sound generating device is an audible device.

10. The object finder of claim 6, wherein the signal means includes a visual generating device.

11. The object finder of claim 9, wherein said visual generating device is a flashing light.

12. The object finder of claim 6, wherein the signal means includes sound and visual generating devices.

13. The object finder of claim 6, and further including means for locating the transmitter if misplaced.

14. The object finder of claim 13, wherein said transmitter locating means includes a support base having a cradle for the transmitter, said base and said transmitter having coacting means such that when the transmitter is separated from the base for a predetermined period of time, an indication signal is emitted from the transmitter for disclosing its location.

15. The object finder of claim 6, wherein each said digital data packet includes at least 20 bits.

16. The object finder of claim 6, wherein the header includes 8 bits, the receiver address includes 4 bits and the transmitter ID includes 6 bits framed by zeros.

17. The object finder of claim 6, wherein the circuitry of each of the transmitter and the receiver includes a microcontroller having a RAM thereby eliminating the need for a memory chip.

18. The object finder of claim 6, wherein the transmitter includes a RAM microcontroller programmed such that the transmitter ID may be changed by toggling the microcontroller.

19. The object finder of claim 6, wherein the receiver is powered by a battery and includes wake-up means and a microcontroller having a RAM with an embedded clock for enabling the receiver to sense a rising edge and a falling edge of an incoming transmission to stay awake thereby materially reducing the wake-up time and materially enhancing battery life.

20. The object finder of claim 6, wherein the receiver is powered by a battery and includes a microcontroller having a RAM with an embedded clock, and having a wake-up means for responding to a valid transmission from the transmitter and for being on for a predetermined period of time within a predetermined time interval and responding to a rising edge and falling edge pattern of a transmission from the transmitter.

* * * * *